US012701516B2

(12) United States Patent
Fang et al.

(10) Patent No.: US 12,701,516 B2
(45) Date of Patent: Aug. 4, 2026

(54) ASSISTED MULTI-LINK BEACON AND GROUPCAST RECEPTION IN A WIRELESS NETWORK

(71) Applicant: MediaTek Singapore Pte. Ltd., Singapore (SG)

(72) Inventors: Yonggang Fang, San Jose, CA (US); Kai Ying Lu, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 421 days.

(21) Appl. No.: 17/949,769

(22) Filed: Sep. 21, 2022

(65) Prior Publication Data

US 2023/0104554 A1    Apr. 6, 2023

Related U.S. Application Data

(60) Provisional application No. 63/280,629, filed on Nov. 18, 2021, provisional application No. 63/251,709, filed on Oct. 4, 2021.

(51) Int. Cl.
*H04W 52/02* (2009.01)
*H04W 48/20* (2009.01)
*H04W 52/24* (2009.01)

(52) U.S. Cl.
CPC ......... *H04W 52/242* (2013.01); *H04W 48/20* (2013.01); *H04W 52/0206* (2013.01)

(58) Field of Classification Search
None
See application file for complete search history.

(56) References Cited

U.S. PATENT DOCUMENTS

| 2015/0350974 A1 | 12/2015 | Patil et al. |
| 2019/0032037 A1 | 1/2019 | Yazdani et al. |
| 2020/0396568 A1* | 12/2020 | Huang ................. H04W 76/40 |

(Continued)

FOREIGN PATENT DOCUMENTS

WO    2021254459 A1    12/2021

OTHER PUBLICATIONS

Huang; et al.;"Estimation of Link Reachability"; Powerpoint; doc.: IEEE 802.11-20/1892r0; Oct. 12, 2020; 10 pp.

(Continued)

*Primary Examiner* — Abdullahi Ahmed
*Assistant Examiner* — Ahmed Saifuddin

(57) ABSTRACT

Embodiments of the present invention provide systems, apparatus and methods that provide transmission information of different APs to a wireless device during link discovery. The transmission information is used to determine AP coverage/link reachability information for performing channel association, channel switching, multi-AP coordination, or groupcast transmission and reception, for example. The transmission information can correspond to APs affiliated with the same AP MLD or APs affiliated with different AP MLDs. In this way, wireless devices can identify a link with sufficient coverage according to reachability information determined for different APs without having to scan each BSS directly, which advantageously reduces power consumption and improves wireless network performance.

21 Claims, 15 Drawing Sheets

(56)     References Cited

U.S. PATENT DOCUMENTS

| | | | | |
|---|---|---|---|---|
| 2021/0014776 | A1* | 1/2021 | Patil | H04W 48/08 |
| 2021/0058868 | A1* | 2/2021 | Cariou | H04W 52/0206 |
| 2021/0274574 | A1 | 9/2021 | Ghosh et al. | |
| 2021/0282119 | A1 | 9/2021 | Asterjadhi et al. | |
| 2023/0083599 | A1* | 3/2023 | Kim | H04W 52/0216 |
| | | | | 370/311 |
| 2023/0104554 | A1* | 4/2023 | Fang | H04W 76/15 |
| | | | | 370/318 |
| 2023/0113050 | A1* | 4/2023 | Huang | H04B 17/309 |
| | | | | 370/338 |
| 2023/0232315 | A1* | 7/2023 | Chitrakar | H04W 48/16 |
| | | | | 370/329 |
| 2024/0064837 | A1* | 2/2024 | Kim | H04L 5/0094 |
| 2024/0251464 | A1* | 7/2024 | Yoshikawa | H04W 84/12 |
| 2024/0364612 | A1* | 10/2024 | Guo | H04W 24/02 |

OTHER PUBLICATIONS

Chitrakar; et al.; "Multi-link Setup clarifications"; Powerpoint; doc.: IEEE 802.11-20/0751r0; May 11, 2020; 18 pp.
Patil; et al.; "MLO: Reachability Problem"; Powerpoint; doc.: IEEE 802.11-20/0508r2; Mar. 15, 2020; 8 pp.
Guogang Huang; et al.; Estimation of Link Reachability; IEEE 802.11-20/1892r2; Date Oct. 12, 2020; 12 pages.

* cited by examiner

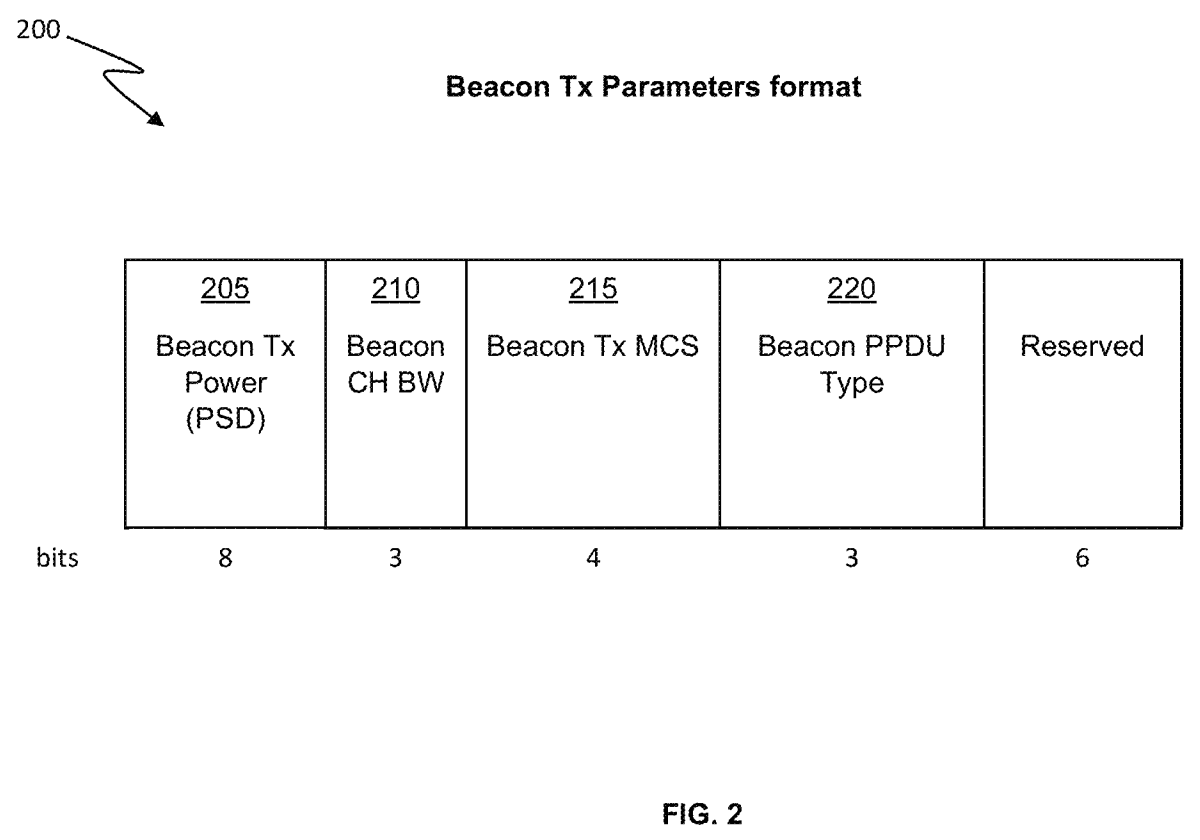

Beacon Tx Parameters format

200

| 205 | 210 | 215 | 220 | |
|---|---|---|---|---|
| Beacon Tx Power (PSD) | Beacon CH BW | Beacon Tx MCS | Beacon PPDU Type | Reserved |
| 8 | 3 | 4 | 3 | 6 | bits

FIG. 2

TBTT Information Set Format

| 405 | 410 | 415 | 420 | 425 | 430 | 435 | 440 |
|-----|-----|-----|-----|-----|-----|-----|-----|
| Neighbor AP TBTT Offset | BSSID (optional) | Short SSID (optional) | BSS Parameters | 20 MHz PSD | MLD Parameters | Beacon Tx Parameters | Groupcast Tx Parameters |
| 1 | 0 or 6 | 0 or 4 | 0 or 1 | 0 or 1 | 0 or 3 | 0 or 3 | 0 or 3 |

Octets

PRE-ASSOCIATION

LINK SELECTION AND SWITCHING

FIG. 8

Figure 9:
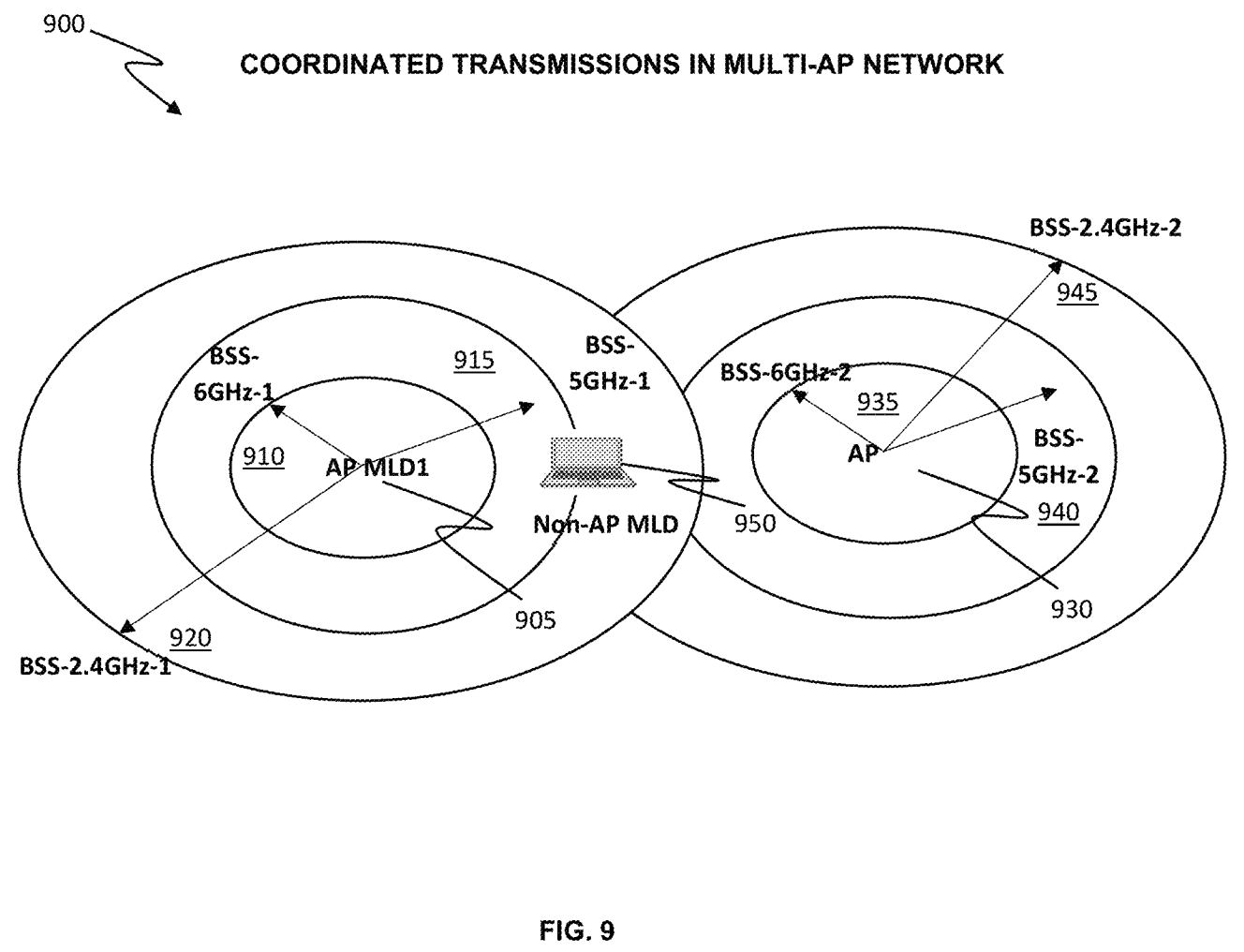

COORDINATED TRANSMISSIONS IN MULTI-AP NETWORK

BSS-2.4GHz-2

945

BSS-
5GHz-2

940

930

935

AP

BSS-6GHz-2

950

BSS-
5GHz-1

Non-AP MLD

915

905

AP MLD1

910

BSS-
6GHz-1

920

BSS-2.4GHz-1

ASSISTANCE TO GROUPCAST TRANSMISSION

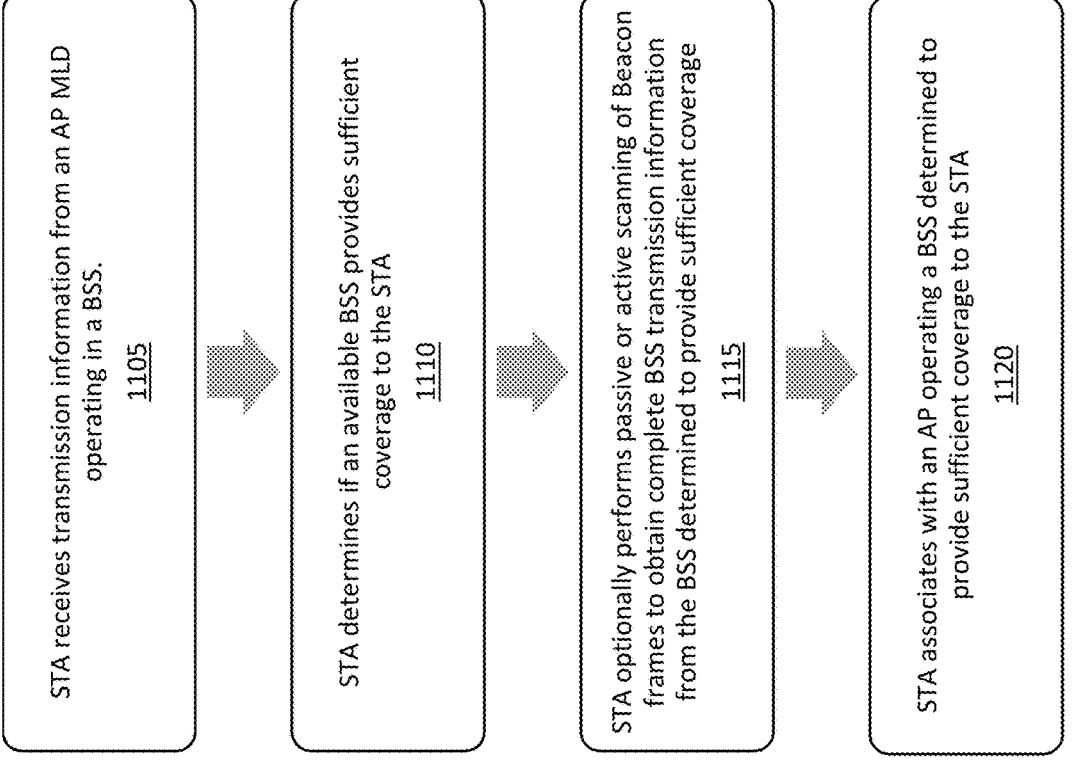

STA receives transmission information from an AP MLD operating in a BSS.

1105

STA determines if an available BSS provides sufficient coverage to the STA

1110

STA optionally performs passive or active scanning of Beacon frames to obtain complete BSS transmission information from the BSS determined to provide sufficient coverage

1115

STA associates with an AP operating a BSS determined to provide sufficient coverage to the STA

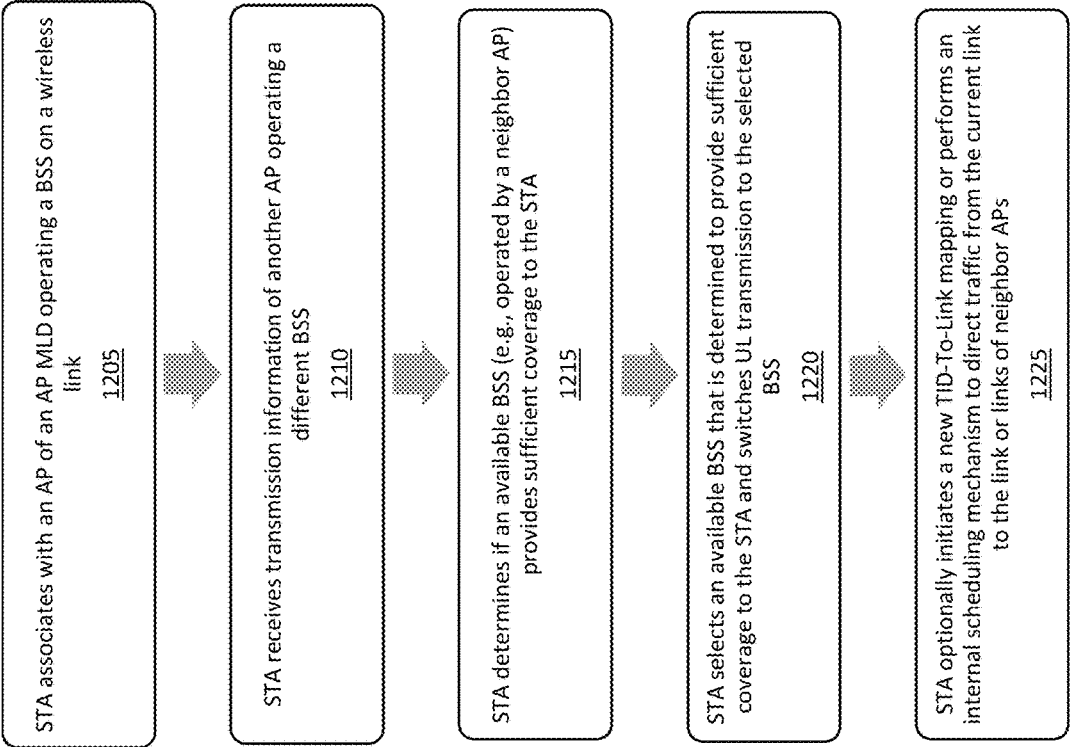

STA associates with an AP of an AP MLD operating a BSS on a wireless link
1205

STA receives transmission information of another AP operating a different BSS
1210

STA determines if an available BSS (e.g., operated by a neighbor AP) provides sufficient coverage to the STA
1215

STA selects an available BSS that is determined to provide sufficient coverage to the STA and switches UL transmission to the selected BSS
1220

STA optionally initiates a new TID-To-Link mapping or performs an internal scheduling mechanism to direct traffic from the current link to the link or links of neighbor APs
1225

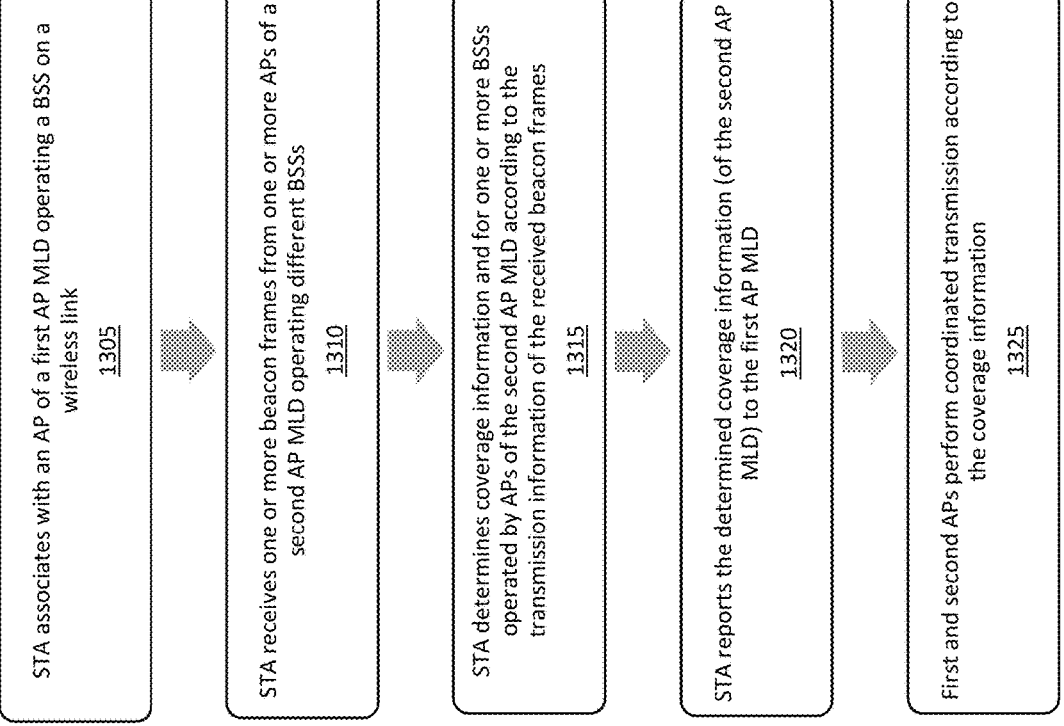

STA associates with an AP of a first AP MLD operating a BSS on a wireless link
1305

STA receives one or more beacon frames from one or more APs of a second AP MLD operating different BSSs
1310

STA determines coverage information and for one or more BSSs operated by APs of the second AP MLD according to the transmission information of the received beacon frames
1315

STA reports the determined coverage information (of the second AP MLD) to the first AP MLD
1320

First and second APs perform coordinated transmission according to the coverage information
1325

Figure 14:
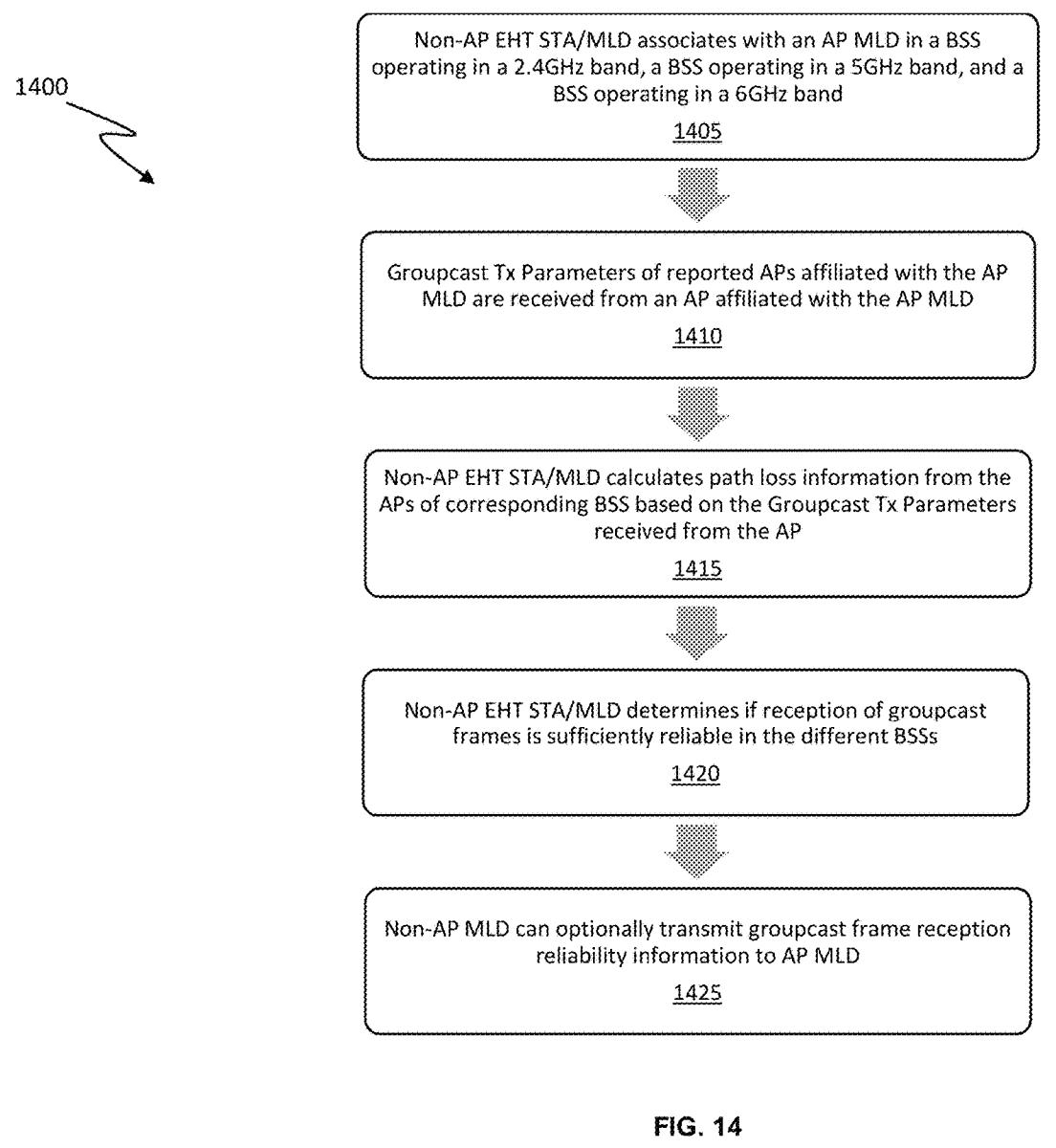

Non-AP EHT STA/MLD associates with an AP MLD in a BSS operating in a 2.4GHz band, a BSS operating in a 5GHz band, and a BSS operating in a 6GHz band

1405

Groupcast Tx Parameters of reported APs affiliated with the AP MLD are received from an AP affiliated with the AP MLD

1410

Non-AP EHT STA/MLD calculates path loss information from the APs of corresponding BSS based on the Groupcast Tx Parameters received from the AP

1415

Non-AP EHT STA/MLD determines if reception of groupcast frames is sufficiently reliable in the different BSSs

1420

Non-AP MLD can optionally transmit groupcast frame reception reliability information to AP MLD

Memory
1510

Processor
1505

Radio
1515

Radio
1520

Radio
1525

ASSISTED MULTI-LINK BEACON AND GROUPCAST RECEPTION IN A WIRELESS NETWORK

CROSS-REFERENCE TO RELATED APPLICATIONS

This application claims the benefit of and priority to provisional patent application Ser. No. 63/251,709, with filing date Oct. 4, 2021, and to provisional patent application Ser. No. 63/280,629, with filing date Nov. 18, 2021, both of which are hereby incorporated by reference in their entirety.

FIELD

Embodiments of the present invention generally relate to the field of wireless communications. More specifically, embodiments of the present invention relate to systems and methods of determining channel transmission and performance information in a wireless network.

BACKGROUND

Modern electronic devices typically send and receive data with other electronic devices wirelessly using Wi-Fi, and many of these electronic devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

The use of a single band may not satisfy the bandwidth or latency needs of certain devices. Therefore, some developing approaches to wireless communication increase communication bandwidth by operating on multiple bands concurrently (technically called link aggregation or multi-link operation). Advantageously, multi-link operations can provide higher network throughput and improve network flexibility compared to traditional single link techniques for wireless communication.

With multi-link devices, different links may have different coverage when they are operating on different radio frequencies, for example. Typically, a reachable link is discovered by a station using passive or active scanning procedure on a channel, and the device determines if the basic service set (BSS) is sufficiently reachable or not. Using typical search and discovery procedures, finding a suitable BSS may require transmitting beacon frames or probe response frames on each operating channel to discover available channels and obtain the BSS information necessary to determine if the channel is suitable for association, or for performing other wireless transmission procedures, such as channel switching, groupcast transmission, and coordinated multi-AP transmissions. For example, after association, a wireless device may switch to a different wireless link if a more suitable wireless link is available. Moreover, a wireless Access Point (AP) Multi-Link Device (MLD) may need to determine if the coverage of a groupcast frame in the BSS is suitable for performing groupcast transmissions, or if the coverage of a unicast frame in each BSS is suitable for performing coordinated transmissions in a multi-AP wireless network when multiple BSSs sufficiently overlap.

Therefore, what is needed is a more efficient approach to discovering and determining coverage information of multi-link BSSs in a wireless network.

SUMMARY

Accordingly, embodiments of the present invention are drawn to systems, apparatus and methods that provide transmission information (e.g., transmission parameters) of different APs to a wireless device during link (or AP) discovery. The transmission information is used to determine AP coverage/link reachability information for performing channel association, channel switching, multi-AP coordination, or for assisting groupcast transmission and reception, for example. The transmission information can correspond to APs affiliated with the same AP MLD ("reported APs") or APs affiliated with different AP MEDS ("neighbor APs"). In this way, wireless devices can estimate and identify a link (or AP) with sufficient coverage according to reachability information determined for different APs without having to scan each BSS directly, which advantageously reduces power consumption and improves wireless network performance.

According to one disclosed embodiment, a method of beacon frame reception in multi-link operation of a wireless network is disclosed. The method includes a first access point (AP) transmitting beacon transmission parameters of a plurality of APs to a non-AP MLD over the wireless network, where the non-AP MLD is operable to calculate path loss information and to estimate the coverage information for the plurality of APs according to received beacon transmission parameters, and a second AP transmitting a frame to the non-AP MLD, where the second AP is selected to transmit the frame to the non-AP MLD responsive to the pathloss information and the transmission parameters indicating that a coverage of the second AP is beyond a threshold.

According to some embodiments, the beacon transmission parameters include parameters used to calculate link budget information from the first AP and the second AP.

According to some embodiments, the beacon transmission parameters are carried in an STA Info field of a multi-link (ML) element carried in a beacon frame transmitted by the first AP.

According to some embodiments, the beacon transmission parameters include at least one of: a transmit power parameter; a channel bandwidth parameter; and a transmission data rate parameter.

According to some embodiments, the beacon transmission parameters include a Link Budget Difference Indication bit carried in a Reduced Neighbor Report (RNR), and the RNR is included in a beacon frame transmitted by the first AP.

According to some embodiments, the first AP and the second AP are affiliated with different AP MLDs.

According to some embodiments, the first AP and the second AP are affiliated with a same AP MLD.

According to some embodiments, the method includes the second AP performing an association procedure with the non-AP MLD after the first AP transmits the beacon transmission parameters of the plurality of APs to the non-AP MLD.

According to a different embodiment, a method of groupcast reception in a wireless network is disclosed. The method includes a first access point (AP) transmitting groupcast transmission parameters of a plurality of APs to a non-AP MLD over the wireless network, where the non-AP MLD is operable to calculate path loss information for groupcast frames transmitted from the plurality of APs according to received groupcast transmission information, and calculate reception reliability information for the plurality of APs according to the pathloss information. The method includes a second AP transmitting a groupcast frame to the non-AP MLD, where the second AP is selected to transmit the groupcast frame based on particular pathloss information calculated from the groupcast transmission parameters indicating that a transmission coverage of the second AP is beyond a threshold.

According to some embodiments, the first AP and the second AP are affiliated with the same AP MLD, and the method includes the AP MLD receiving groupcast frame reception reliability information from the non-AP MLD, and the AP MLD selecting the second AP to transmit groupcast frames to the non-AP MLD according to the frame reception reliability information.

According to some embodiments, the groupcast transmission parameters include information used to calculate the link budget information of the first AP and the second AP.

According to some embodiments, the second AP is selected based on a link budget difference.

According to some embodiments, the groupcast transmission parameters include at least one of: a transmit power parameter; a channel bandwidth parameter; and a transmission data rate parameter.

According to some embodiments, the groupcast transmission parameters are included in a Reduced Neighbor Report (RNR) carried in a beacon frame transmitted by the first AP.

According to some embodiments, the groupcast transmission parameters are carried in an STA Info field of a multi-link (ML) element carried in a groupcast frame transmitted by the first AP.

According to some embodiments, the first AP and the second AP are affiliated with different AP MLDs.

According to a different embodiment, a method of reception in a wireless network is disclosed. The method includes a first wireless station (STA) of a non-AP multi-link device (MLD) receiving a first frame from a first wireless access point (AP) of an AP MLD, the first frame including reachability information of APs affiliated with the AP MLD, and the non-AP MLD receiving a second frame from a second AP of the AP MLD. The second AP of the AP MLD is selected to transmit the second frame based on the reachability information.

According to some embodiments, the method includes the non-AP MLD changing a link status of the non-AP MLD to receive the second frame from the second AP of the AP MLD.

According to some embodiments, the method includes the non-AP MLD switching to a different wireless channel and using the different wireless channel to receive the second frame from the second AP of the AP MLD according to the reachability information.

According to some embodiments, the reachability information includes a link budget difference when a link budget of the second AP of the AP MLD is greater than a link budget of the first AP of the AP MLD.

According to some embodiments, the first frame includes a beacon frame, and the second frame includes at least one of: a data frame; a management frame; and a control frame.

According to some embodiments, the first frame and the second frame include groupcast frames, and the method further includes determining groupcast frame reception reliability information based on the reachability information, and transmitting the groupcast frame reception reliability information to the AP MLD. The second AP of the AP MLD is selected to transmit the second frame based on the groupcast frame reception reliability information.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 depicts an exemplary data structure for carrying beacon transmission parameters in a wireless network according to embodiments of the present invention.

FIG. 4 depicts an exemplary target beacon transmit time (TBTT) information element carrying beacon and groupcast transmission parameters of a wireless AP according to embodiments of the present invention.

FIG. 8 depicts an exemplary wireless network including an AP MLD in wireless communication with non-AP EHT STA/MLD performing link selection and/or switching during multi-link operation according to embodiments of the present invention.

FIG. 9 depicts an exemplary multi-AP wireless network including AP MLDs and in communication with non-AP EHT STA/MLD to perform coordinated multi-AP transmissions according to embodiments of the present invention.

FIG. 11 is a flow chart depicting an exemplary sequence of computer implemented steps implementing a process for determining AP transmission parameters of a BSS prior to association according to embodiments of the present invention.

FIG. 12 is a flow chart depicting an exemplary sequence of computer implemented steps implementing a process for determining AP transmission parameters of a BSS to perform link selection and/or link switching according to embodiments of the present invention.

FIG. 13 is a flow chart depicting an exemplary sequence of computer implemented steps of a process for performing coordinated transmission in a multi-AP wireless network according to embodiments of the present invention.

FIG. 14 is a flow chart depicting an exemplary sequence of computer implemented steps implementing a process for assisting groupcast transmission according to embodiments of the present invention.

DETAILED DESCRIPTION

Figure 1:
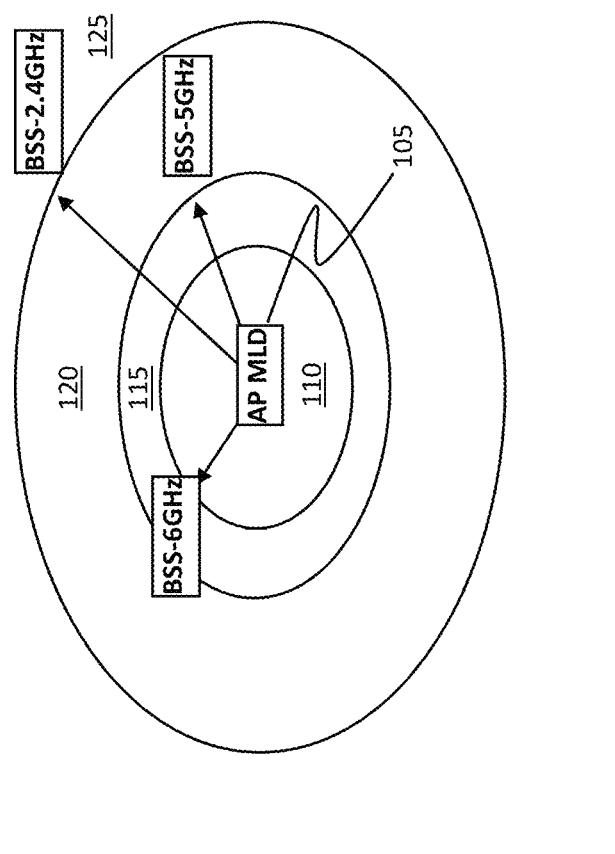
FIG. 1 depicts an exemplary wireless network including access point coverage of multiple wireless links or channels for communicating with wireless devices according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 11-14) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Techniques for Assisted Multi-Link Beacon and Groupcast Reception

Embodiments of the present invention are drawn to systems, apparatus and methods that provide transmission information of different APs to a wireless device during link discovery. The transmission information is used to determine AP coverage ("link reachability") information for performing channel association, channel switching, multi-AP coordination, or groupcast transmission and reception, for example. The transmission information (e.g., beacon or groupcast transmission parameters) can correspond to APs affiliated with the same AP MLD or APs affiliated with different AP MLDs. In this way, wireless devices can identify a link with sufficient coverage according to reachability information determined for different APs without having to scan each BSS directly, which advantageously reduces power consumption and improves wireless network performance.

FIG. 1 depicts an exemplary AP coverage in a wireless network 100 including multiple wireless links or channels for communicating with wireless devices according to embodiments of the present invention. In the example of FIG. 1, AP MLD 105 uses a 6 GHz wireless band to communicate with a non-AP MLD in basic service set (BSS) 110, a 5 GHz wireless band to communicate with the device in BSS 115, and a 2.4 GHz wireless band to communicate with the device in BSS 120. The coverage range of 2.4 GHz BSS 120 typically exceeds the coverage of 5 GHz BSS 110 and 6 GHz BSS 115 under the same transmission parameters, like transmit power; however, 2.4 GHz BSS 120 may be more congested and may support narrower bandwidths compared to 5 GHz BSS 110 and 6 GHz BSS 115.

A wireless non-AP MLD that has discovered AP MLD 110 may want to communicate with AP MLD 110 using BSS 110 or 115, but may not know the coverage information of BSS 110 or 115. Therefore, according to embodiments of the present invention, transmission information of APs corresponding to BSS 110 and/or BSS 115 can be provided by the AP corresponding to another BSS (e.g., BSS 120). As a result, a wireless device connected to wireless network 100 can find a link with sufficient coverage in advance according to reported reachability information (e.g., beacon or groupcast transmission parameters) which advantageously reduces power consumption, and the association procedure with the AP MLD can be performed more quickly and efficiently compared to traditional approaches.

Embodiments of the present invention can carry channel number, transmit power, channel bandwidth, channel modulation and coding scheme rate, and beacon frame physical layer protocol data unit (PPDU) type information of neighbor APs in a beacon frame or probe response frame transmitted from the reporting access point. Based on the transmission parameters included in the beacon or probe response frame transmitted from the reporting access point, the coverage of an AP can be calculated and determined operating in different wireless bands.

A link budget information (e.g., link radio characteristics between AP and non-AP) can provide an estimation to assist in determining the coverage of an AP. The link budget information can be used by a non-AP MLD to determine whether or not to perform a passive scan of beacon frames transmitted from the AP affiliated with an AP MLD, or to perform an active scan by transmitting a probe request and receiving a probe response from the AP affiliated with the AP MLD. Based on the beacon transmission parameters of the beacon link budget difference indicated in a RNR, the non-AP MLD can determine whether it is within the coverage of an AP included in the RNR, and can decide whether or not to discover or associate with the AP MLD through an AP accordingly.

Fast passive and active scanning are supported according to embodiments. For fast passive scanning, the AP MLD provides BSS information of the transmitting AP affiliated with the AP MLD and Beacon transmission parameters of other affiliated APs. A beacon link budget difference indication for determining coverage of an AP can be included in a reduced neighbor report (RNR). For fast active scanning, an AP MLD provides BSS information of a transmitting AP affiliated with the AP MLD, and beacon transmission parameters of other affiliated APs in an RNR or a STA Info of Multi-Link element carried in a multi-link probe response. Groupcast transmission parameters can be provided for a non-AP extremely high throughput (EHT) STA/MLD to estimate reachability of the link corresponding to an AP and feedback a groupcast frame reception reliability information to assist the AP MLD to determine a link or links to use for groupcast transmission.

Beacon transmission parameters describing a PPDU for beacon frame or groupcast transmission can be transmitted using one or more fields of an information element. The exemplary data structures (parameter sets) depicted in FIGS. 2 and 3 can be used to transmit such transmission parameters, and include more fields or fewer fields than depicted in the examples. The AP transmission parameters can be used by a non-AP MLD to estimate and determine if the coverage of an AP is sufficient during BSS discovery before scanning each BSS corresponding to available AP independently, performing link selection and switching, performing coordinated transmissions in a multi-AP network, and/or if the coverage of groupcast of an AP is sufficient to assist in groupcast transmission, according to embodiments.

FIG. 2 depicts an exemplary data structure 200 for carrying AP transmission parameters in a wireless network according to embodiments of the present invention. Beacon transmission (Tx) power field 205 indicates transmit power with unit interpretation of power strength density (PSD), e.g., Effective Isotropic Radiated Power (EIRP), which can be represented in dBm/MHz. For example, the beacon transmit power can be calculated as Beacon Tx Power+10 $Log_{10}$ (Beacon Channel Bandwidth), where the Beacon Channel Bandwidth is represented in MHz. Beacon Channel BW field 210 indicates the channel bandwidth of Beacon frame, e.g., 0: 20 MHz; 1: 40 Mhz; 2: 80 MHz; 3: 160 MHz; 4: 320 MHz. Beacon Tx modulation and coding scheme (MCS) field 215 indicates the MCS rate used for beacon frame transmission. Beacon PPDU Type field 220 indicates the PPDU type (e.g., duplicate or non-duplicate) of the beacon PPDU, e.g., 0: Non-HT PPDU; 1: ER SU PPDU; 2: HE SO PPDU.

Figure 3:
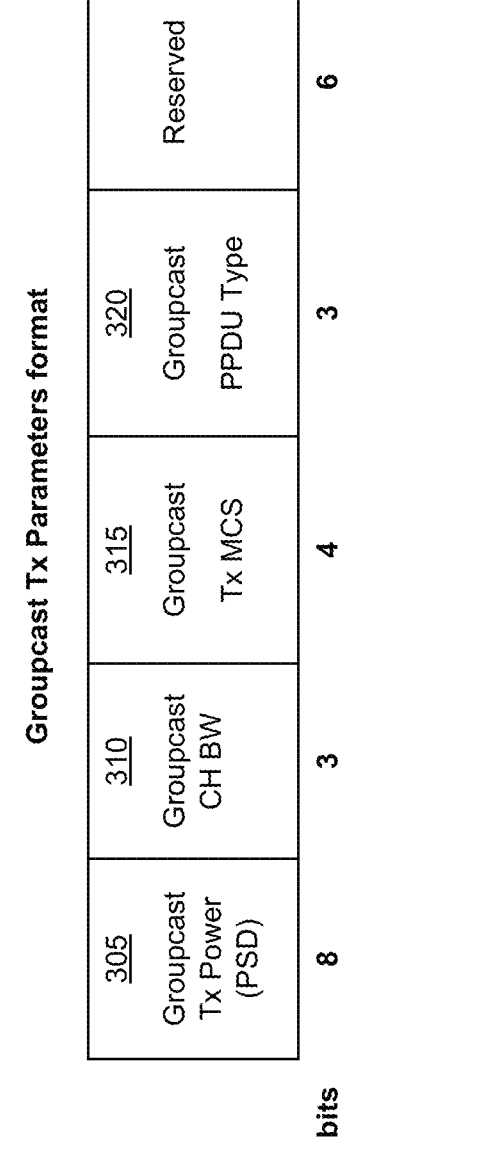
FIG. 3 depicts an exemplary data structure for carrying groupcast transmission parameters in a wireless network according to embodiments of the present invention.

FIG. 3 depicts an exemplary data structure 300 for carrying groupcast transmission parameters in a wireless network according to embodiments of the present invention. Groupcast Tx Parameters are used to transmit a PPDU of a Groupcast frame and include one or more fields 305-320 according to embodiments of the present invention. Groupcast Tx Power (PSD) field 305 indicates the transmit power with unit interpretation of PSD, e.g., EIRP, in dBm/MHz. Groupcast transmit power (in dBm) can be calculated by Groupcast Tx Power+10 $Log_{10}$(Groupcast Channel BW), where the Groupcast Channel BW is represented in MHz. Groupcast Channel BW field 310 indicates the channel bandwidth of the groupcast frame, e.g., 0: 20 MHz; 1: 40 Mhz; 2: 80 MHz; 3: 160 MHz; 4: 320 MHz. Groupcast Tx MCS field 315 indicates the MCS rate used for groupcast frame transmission. Groupcast PPDU Type field 320 indicates the PPDU type (e.g., duplicate or non-duplicate) of the groupcast PPDU, e.g., 0: Non-HT PPDU; 1: ER SU PPDU; 2: HE SU PPDU.

Figure 5:
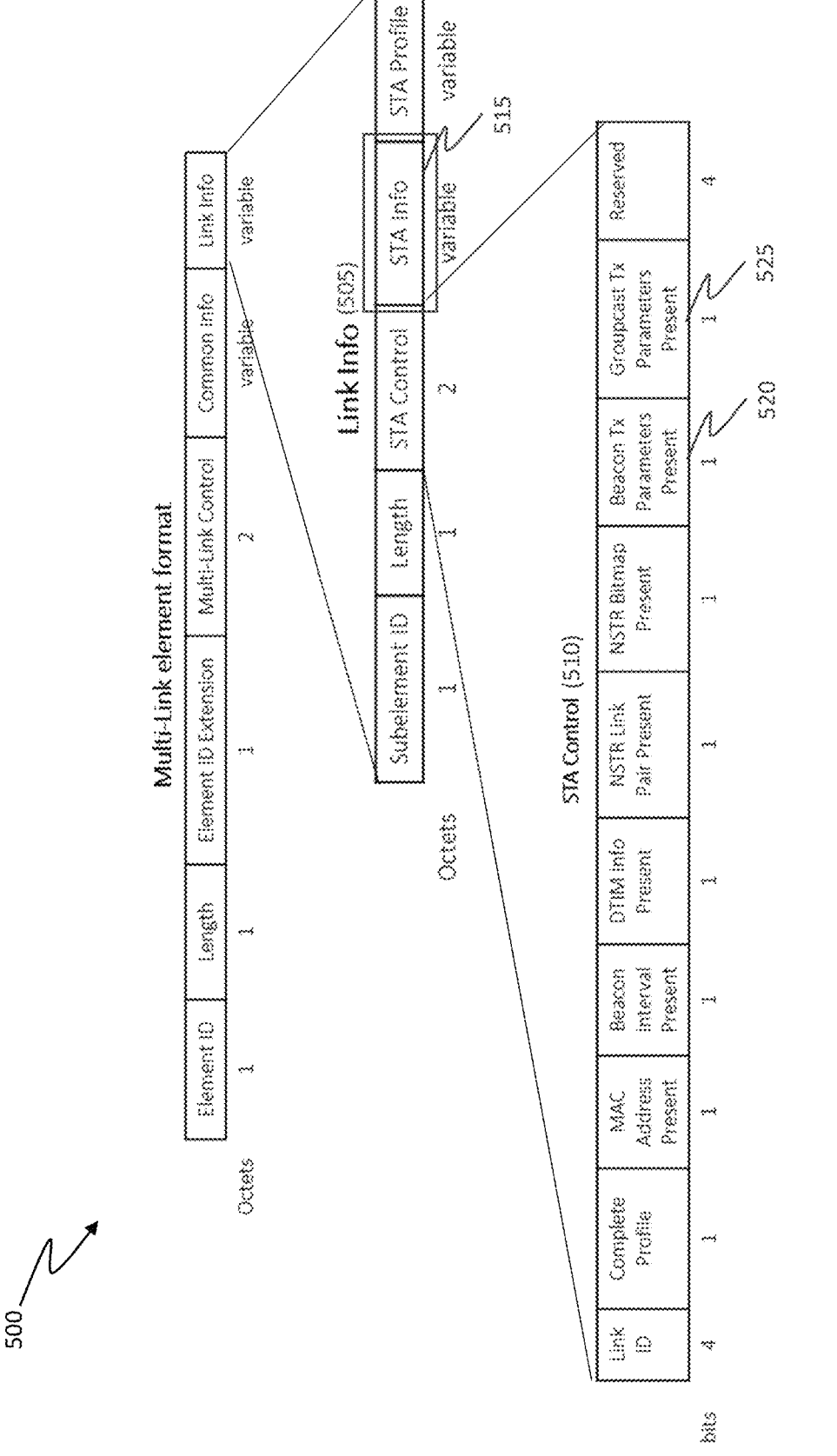
FIG. 5 depicts an exemplary multi-link information element carrying beacon and groupcast transmission parameters of a wireless AP according to embodiments of the present invention.
Figure 6:
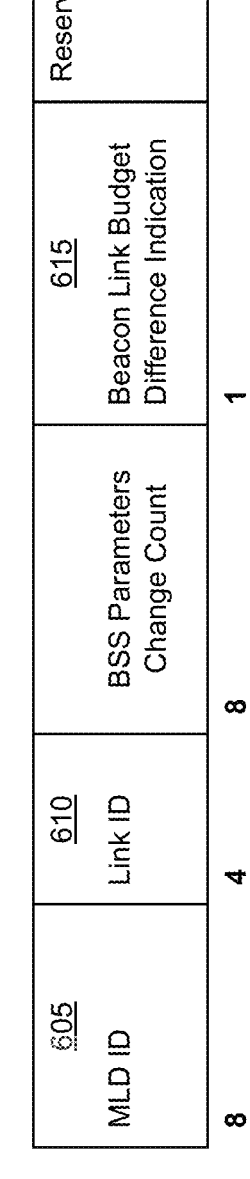
FIG. 6 depicts an exemplary information element for carrying a beacon link budget difference indication in a wireless network according to embodiments of the present invention.

FIGS. 4, 5, and 6 depict exemplary information elements for carrying transmission information of wireless links, for example, the exemplary parameter sets 200 and 300 described above with regard to FIGS. 2 and 3. The transmission information can include beacon or groupcast transmission parameters of reported APs affiliated with the same AP MLD, or neighbor APs which are co-located with the reporting AP, for example.

FIG. 4 depicts an exemplary information element 400 including fields carrying beacon and groupcast transmission parameters of an AP according to embodiments of the present invention. The Beacon and Groupcast Tx Parameters can be included in an RNR, which can be included in a beacon frame or probe response. The RNR contains a TBTT information set that can include the transmission parameters, such as Neighbor AP TBTT Offset 405, BSSID 410, Short SSID 415, BSS Parameters 420, 20 MHz PSD 425, MLD Parameters 430, Beacon Tx Parameters 435, and Groupcast Transmission Parameters 440.

Beacon Tx Parameters 435 carries the Beacon Tx information of neighbor APs affiliated with the same MLD as the reporting AP, or the Beacon Tx information of neighbor APs which are not affiliated with the same AP MLD as the reporting AP. Groupcast Tx parameters 440 carry the groupcast Tx information of neighbor APs affiliated with the same MLD as the reporting AP or the transmission parameters of neighbor APs which are collocated but not affiliated with the same AP MLD as the reporting AP.

FIG. 5 depicts an exemplary multi-link (ML) information element 500 carrying beacon and groupcast transmission parameters of a reported or neighbor AP according to embodiments of the present invention. Link info field 505 of ML information element 500 includes STA Control field 510. A Beacon Tx Parameters subfield is included in STA Info subfield 515 if the Beacon Tx Parameters Present bit 520 in STA Control field 510 is set to 1. Otherwise, a Beacon Tx Parameters subfield is not included in the STA Info subfield. A Groupcast Tx parameters subfield is included in STA Info subfield 515 if the Groupcast Tx Parameters Present bit 525 in STA control field is set to 1. Otherwise, the Groupcast Tx Parameters subfield is not included in the STA Info subfield 515.

According to embodiments, the Beacon Tx Parameters subfield (if present) carries the Beacon Tx information of reported or neighbor APs. The Groupcast Tx parameters subfield (if present) carries the groupcast Tx information of reported or neighbor APs.

FIG. 6 depicts an exemplary information element 600 including fields for carrying a link budget difference indication in a wireless network according to embodiments of the present invention. The link budget difference indication between the reporting AP and the reported or neighbor AP can be based on a Beacon Tx power difference, an operating frequency difference, etc., which can be used to determine BSS coverage, according to some embodiments. The different AP MLDs and links are identified in MLD ID field 605 and Link ID field 610, respectively.

To determine the value of Beacon Link Budget difference indication bit 615, several values are calculated.

The beacon Tx power difference between AP1 and AP2 is calculated as:

$$dP(AP1,AP2)=P2-P1;$$

The path loss caused by the difference of operation channel frequencies between AP1 and AP2 is calculated as:

$$dF(AP1,AP2)=20\ Log_{10}(CH2)-20\ Log_{10}(CH1);$$

The difference of the duplicate PPDU combination gain (CG) of beacon frames between AP1 and AP2 is calculated as:

$$dG(AP1,AP2)=CG(AP2)-CG(AP1).\ \text{If a Beacon is}$$
transmitted in non-duplicate PPDU, the CG is
0. If a Beacon is transmitted in duplicate PDDU
over 4×20 MHz channel, the CG is $10\ Log_{10}(4)$
=6 dB;

The signal-to-noise ratio (SNR) difference of MCS used by Beacon transmission of AP2 and AP1 is calculated as:

$$dM(AP1,AP2)=MCS(AP2)-MCS(AP1)\ \text{is.}$$

According to embodiments, the Beacon Link Budget Difference Indication bit 605 in MLD Parameter subfield of ML Element is set to 1 if dP(AP1, AP2)+dG(AP1, AP2)−dF(AP1, AP2)−dM(AP1, AP2) equal to or greater than a threshold value. The threshold value can be 0, 3 dB, or any number greater than 0, for example. Otherwise, Beacon Link Budget Difference Indication bit 615 is set to 0. The Beacon Link Budget Difference Indication bit 615 can be used by a non-AP STA/MLD to determine if the coverage of an AP is sufficient during BSS discovery prior to scanning for beacon frames to obtain information from each available AP independently. The Beacon Link Budget Difference Indication bit 615 can also be used to assist in link selection and link switching during operation, and to performed coordinated transmissions in a multi-AP network, which can significantly improve performance and reduces power consumption in the wireless network.

Figure 7:
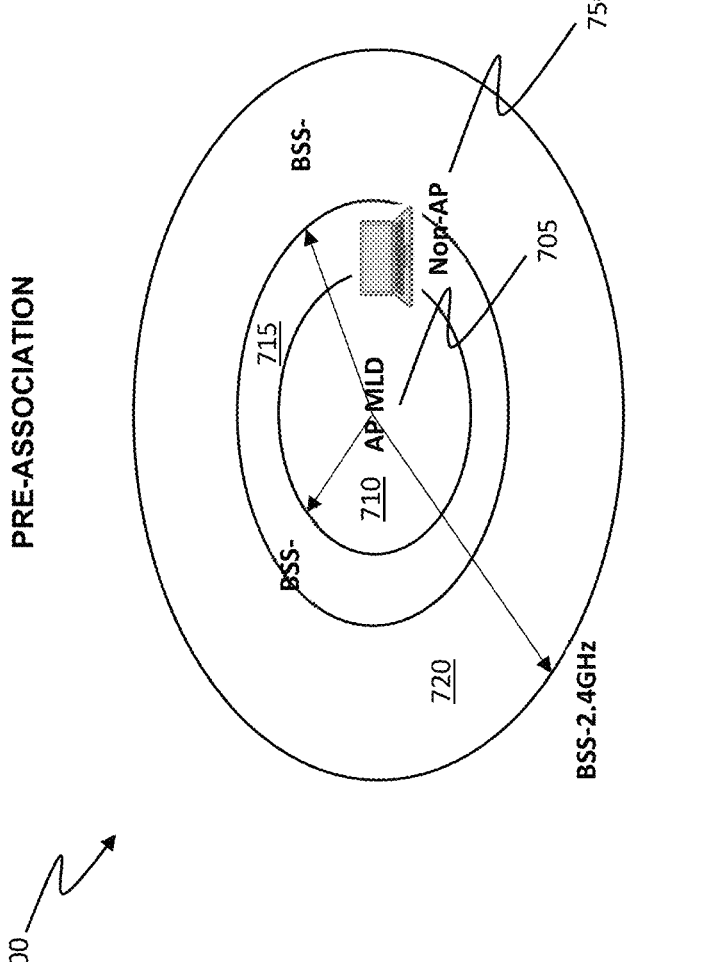
FIG. 7 depicts an exemplary wireless network including an AP MLD in wireless communication with non-AP Extremely high throughput STA/MLD during BSS discovery and selection prior to association according to embodiments of the present invention.

FIG. 7 depicts an exemplary wireless network 700 including an AP MLD 705 in wireless communication with non-AP Extremely high throughput (EHT) STA/MLD 750 during BSS discovery and selection of pre-association according to embodiments of the present invention. In the example of FIG. 7, APs affiliated with AP 705 operate in 2.4 GHz band BSS 720, a 5 GHz band BSS 715, and 6 GHz band BSS 710. Non-AP EHT STA/MLD can acquire Beacon Tx Parameters (e.g., Tx Power, Channel Frequency, MCS rate and/or PPDU type) of reported APs affiliated with the AP MLD that are advantageously provided a RNR or Multi-Link element of a Beacon frame or Probe Response frame received from the transmitting AP (e.g. BSS-2.4 GHz 720) prior to association. Non-AP ETH STA/MLD 750 may also acquire Beacon Link Budget Difference Indications of reported APs affiliated with the AP MLD in an RNR carried in a Beacon frame or Probe Response frame received from the transmitting AP prior to association.

Based on the beacon Tx Parameters of reported APs, non-AP EHT STA/MLD 750 can calculate the BSS coverage of reported APs affiliated with the AP MLD, and can determine whether it is in the BSS coverage of reported APs based the path loss of the BSS of the reporting AP, for example. Non-AP EHT STA/MLD 750 can also determine that it is within the BSS coverage of a reported AP if a Beacon Link Budget Difference Indication bit for that AP is set to 1. For example, if non-AP EHT STA/MLD 750 knows it is in the coverage of BSS-5 GHz (for example), it may acquire complete BSS information of the reported APs using a passive or active scan in the 5 GHz band BSS 715, and performs association with AP MLD 705 through the BSS on the 5 GHz band BSS 715. In this way, non-AP EHT STA/MLD 750 AP can associate with AP MLD 705 through a fast link that provides suitable coverage. Subsequent to association, AP 705 can and non-AP EHT STA/MLD 750 can communicate wirelessly using data frames, management frames, and control frame, for example.

Figure 8:
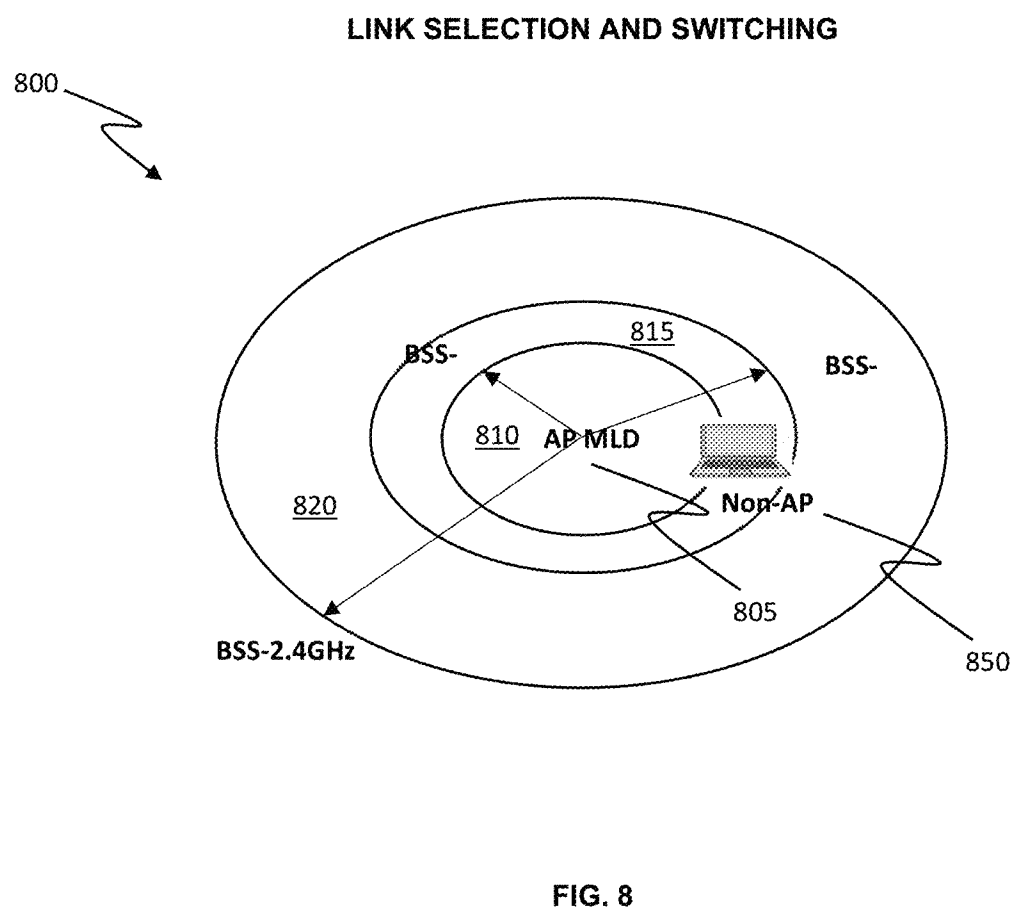

FIG. 8 depicts an exemplary wireless network 800 including an AP MLD 805 in wireless communication with non-AP EHT STA/MLD 850 performing link selection and/or switching during operation according to embodiments of the present invention. In the example of FIG. 8, non-AP EHT STA/MLD 850 associates with the AP MLD 805 through BSS-2.4 GHz operating in 2.4 GHz band BSS 820. Based on Beacon Tx Parameters of neighbor APs affiliated with AP MLD 805 carried in an RNR of a beacon frame transmitted in BSS-2.4 GHz, non-AP EHT STA/MLD 850 can calculate the path loss of the reporting AP in BSS-2.4 GHz and find whether it is in the coverage of reported APs affiliated with the AP MLD 805 (e.g., BSS-5 GHz or BSS-6 GHz).

Non-AP EHT STA/MLD 850 can determine if it is within the BSS coverage of a reported AP if a Beacon Link Budget Difference Indication bit for that AP is set to 1. Non-AP EHT STA/MLD 850 then can decide whether or not it starts to switch transmissions to another link or links to obtain higher throughput and/or better quality of service (QoS). If non-AP EHT STA/MLD 850 determines that it is within sufficient coverage of a BSS of a reported AP affiliated with AP MLD 805, it may initiate new TID-To-Link mapping or use an internal scheduling mechanism to direct the traffic from the current link (e.g., in BSS-2.4 GHz) to the links of reported APs (e.g., BSS-5 GHz) to improve performance.

Moreover, for example, non-AP EHT STA/MLD 850 can calculate the path loss of a BSS of the reporting AP in BSS-2.4 GHz to estimate and determine if it is within the BSS coverage of a reported AP affiliated with AP MLD 805 (e.g. BSS-5 GHz or BSS-6 GHz) according to the information in the Beacon Tx Parameters of reported APs affiliated with the AP MLD 805 carried in RNR or Multi-Link element of Beacon frame transmitted in BSS-2.4 GHz. Non-AP EHT STA/MLD 850 then can decide whether it needs to switch transmissions to another link or links to obtain higher throughput and/or better QoS performance.

If non-AP EHT STA/MLD 850 determines that the BSS coverage of a reported AP affiliated with AP MLD 805 is sufficient, it may initiate a new TID-To-Link mapping or use an internal scheduling mechanism to direct the traffic from the current link (e.g., in BSS-2.4 GHz) to one or more links of neighbor APs (e.g. BSS-5 GHz) to improve performance.

FIG. 9 depicts an exemplary multi-AP wireless network 900 including AP MLDs 905 and 935 in communication with non-AP EHT STA/MLD 950 to perform coordinated multi-AP transmissions according to embodiments of the present invention. In Multi-AP networks, non-AP MLD can use Beacon Tx Parameters of neighbor APs affiliated with different AP MLDs to determine the coverage of BSSs formed by different APs. For example, Tx Power, Channel Frequency, MCS rate and beacon frame PPDU type can be used to determine the coverage of a BSS. The coverage of reporting and/or neighbor APs and other transmission information, such as the path loss to the non-AP MLD from neighbor APs, can be used to estimate the links' condition for coordinated multi-AP transmissions. For example, coordinated transmission groups can be formed, and the APs can coordinate to perform coordinated spatial reuse, coordinated beam forming, coordinated joint transmissions, etc.

In the example of FIG. 9, non-AP MLD 950 associated with AP MLD1 is in the coverage area of 5 GHz BSS 920 and 2.4 GHz BSS, which overlaps with BSS-5 GHz-2 and BSS-2.4 GHz-2 of AP MLD2. Non-AP MLD 950 can measure the path loss of a beacon received frame from neighbor APs, such as 5 GHz BSS 940 affiliated with AP MLD2 930, and can report transmission information to AP MLD1 905. AP MLD1 905 and AP MLD2 930 can perform Coordinated Spatial Reuse (C-SR) transmission on the 5 GHz channel. Non-AP MLD 950 can also estimate and determine that it is in the coverage of BSS-5 GHz-2 when a Beacon Link Budget Difference Indication bit is set to 1 for 5 GHz BSS 940 in an RNR carried in a beacon frame received in 2.4 GHz BSS 945, for example.

Figure 10:
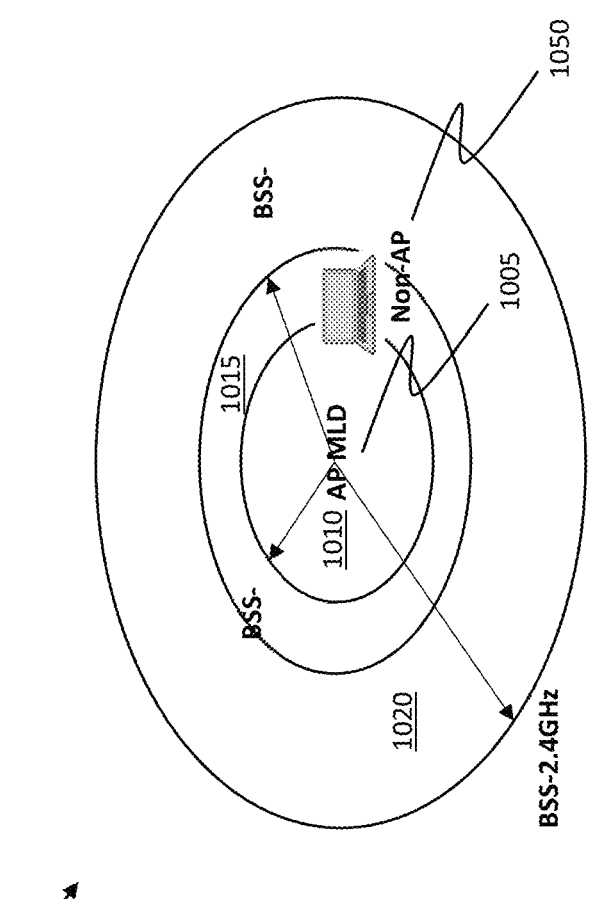
FIG. 10 depicts an exemplary wireless network including AP MLD transmitting groupcast frames according to embodiments of the present invention.

FIG. 10 depicts an exemplary wireless network 1000 including AP MLD 1005 transmitting groupcast frames according to embodiments of the present invention. Non-AP EHT STA/MLD 1050 associates with AP MLD in BSS-2.4 GHz, BSS-5 GHz and BSS-6 GHz. Groupcast Tx Parameters of reported APs affiliated with AP MLD 1005 provided to non-AP EHT STA/MLD 1050 can include Groupcast transmission power, MCS rate and PPDU type, for example. Based on the Groupcast Tx Parameters, non-AP EHT STA/MLD 1050 can calculate path loss from the APs of corresponding BSSs, and can determine whether reception of groupcast frames in the different BSSs is sufficiently reliable.

Non-AP MLD 1005 may provide the determined groupcast frame reception reliability information to the APs MLDs through a message such as a control frame (e.g., an Ack or Block Ack frame), a management frame, or an A-Ctrl field in a data frame, to assist the AP MLDs to select a link to transmit groupcast frame to EHT non-AP STA/MLD 1050. Determining the groupcast transmission information of different APs and providing the determined transmission information in this way advantageously improves groupcast performance and reliability in the wireless network 1000.

FIG. 11 is a flow chart depicting an exemplary sequence of computer implemented steps of a process 1100 for determining the coverage of an AP based on beacon transmission parameters of the AP prior to association according to embodiments of the present invention.

At step 1105, an STA receives transmission information from an AP affiliated with AP MLD operating in a BSS. In the example of FIG. 11, the transmission information includes beacon transmission parameters of other APs, such as beacon Tx power, channel frequency, MCS rate, and/or PPDU type, for example. The beacon transmission parameters can be carried in a beacon frame received from the reporting AP. The transmission information describes one or more APs operating in different BSSs, for example, reported APs affiliated with the AP MLD that are configured to operate on different wireless bands, or neighbor APs affiliated with different AP MLDs operating on the same or different wireless bands (e.g., 2.4 GHz, 5 GHz, or 6 GHz). According to some embodiments, the transmission information is included in a RNR or ML element included in a ML probe response. According to some embodiments, the transmission information includes link budget information, such as a Link Budget Difference Indication bit carried in an RNR.

At step 1110, the STA determines if a BSS operated by a neighbor or reported AP provides sufficient coverage to the STA. Step 1110 can include determining if the coverage is sufficient according to transmit power, bandwidth, and path loss information, or determining if a Link Budget Difference Indication bit carried in an RNR is set to 1, for example.

At step 1115, the STA optionally performs a passive or active scanning procedure to obtain complete BSS transmission information from the AP determined to provide sufficient coverage.

At step 1120, the STA associates with the AP MLD via an AP operating a BSS determined to provide sufficient coverage to the STA. For example, the AP selected for association can be selected based on a link budget difference or pathloss and bandwidth information, for example.

FIG. 12 is a flow chart depicting an exemplary sequence of computer implemented steps of a computer-controlled process 1200 for performing link selection and/or link switching using transmission information of an AP according to embodiments of the present invention. Switching links based on transmission information of an AP can advantageously improve network performance and reduce power consumption.

At step 1205, an STA associates with an AP of an AP MLD operating a BSS on a wireless link (e.g., a 2.4 GHz wireless link).

At step 1210, the STA receives transmission information of another AP operating a different BSS, such as a reported AP affiliated with the AP MLD operating on a different wireless link (e.g., a 5 Ghz or 6 Ghz wireless link). The transmission information of the AP may include beacon transmission parameters, such as beacon Tx power, channel frequency, MCS rate, and/or PPDU type, for example, and the beacon transmission parameters may be carried in a beacon frame received from a reporting AP affiliated with the AP MLD. According to some embodiments, the transmission information is included in a RNR or ML element included in a ML probe response, for example. According to some embodiments, the transmission information includes link budget information, such as a Link Budget Difference Indication bit carried in an RNR.

At step 1215, the STA determines if an available BSS operated by a neighbor or reported AP provides sufficient coverage to the STA. Step 1210 can include determining if BSS coverage is sufficient according to transmit power, MCS, bandwidth and path loss information, or determining if a Link Budget Difference Indication bit carried in an RNR is set to 1, for example.

At step 1220, the STA selects an available BSS that is determined to have sufficient coverage to the STA and switches transmission on the selected BSS.

At step 1225, the STA optionally initiates a new TID-To-Link mapping or performs an internal scheduling mechanism to direct traffic from the current link (e.g., the 2.4 GHz wireless link) to the link or links of a neighbor or reported AP (e.g., the AP operating the 5 GHz wireless link).

FIG. 13 is a flow chart depicting an exemplary sequence of computer implemented steps of a process 1300 for performing coordinated transmission in a multi-AP wireless network according to embodiments of the present invention.

At step 1305, an STA associates with an AP of a first AP MLD operating a BSS on a wireless link (e.g., a 2.4 GHz wireless link).

At step 1310, the STA receives one or more beacon frames from one or more APs of a second AP MLD operating different BSSs. The beacon frames can include transmission information of the BSSs such as Tx power, channel frequency, MCS rate, and PPDU type (e.g., duplicate or non-duplicate), or an RNR including a Budget Link Difference Indication bit, for example.

At step 1315, the STA determines coverage information for one or more BSSs operated by APs of the second AP MLD according to the transmission information of the beacon frames received in step 1310. Step 1315 can include determining path loss information for the different BSSs.

At step 1320, the STA reports the determined coverage information (of the second AP MLD) to the first AP MLD.

At step 1325, the first and second APs perform coordinated transmission according to the coverage information reported in step 1320. For example, the first and second APs can perform coordinated CSR transmission on the 5 GHz wireless link and can perform coordinated multi-AP transmissions, such as forming coordinated transmission groups, performing coordinated spatial reuse, performing coordinated beam forming, performing coordinated joint transmissions, etc.

FIG. 14 is a flow chart depicting an exemplary sequence of computer implemented steps of a process 1400 for assisting groupcast transmission according to embodiments of the present invention.

At step 1405, a non-AP EHT STA/MLD associates with an AP MLD in a BSS operating in a 2.4 GHz band, a BSS operating in a 5 GHz band, and a BSS operating in a 6 GHz band.

At step 1410, Groupcast Tx Parameters of reported APs affiliated with the AP MLD are received from an AP affiliated with the AP MLD. The Groupcast Tx Parameters can include Groupcast transmit power, MCS rate and PPDU type used by groupcast in the different BSSs.

At step 1415, the non-AP EHT STA/MLD calculates path loss information from the APs of corresponding BSS based on the Groupcast Tx Parameters received from the AP in step 1410.

At step 1420, the non-AP EHT STA/MLD determines if reception of groupcast frames is sufficiently reliable in the different BSSs (e.g., the BSSs operating in 2.4 GHz, 5 GHz and 6 GHz wireless bands) based on the pathloss information calculated in step 1415.

At step 1425, the non-AP MLD can optionally transmit groupcast frame reception reliability information determined in step 1420 to an AP MLD using a control frame (e.g., Ack frame or Block Ack frames, etc.) or a management frame or an A-Control field of data frame, and the AP MLD can select a link with sufficient coverage to transmit groupcast frame to the non-AP MLD based on the groupcast frame reception reliability information.

Exemplary Computer Controlled System

Figure 15:
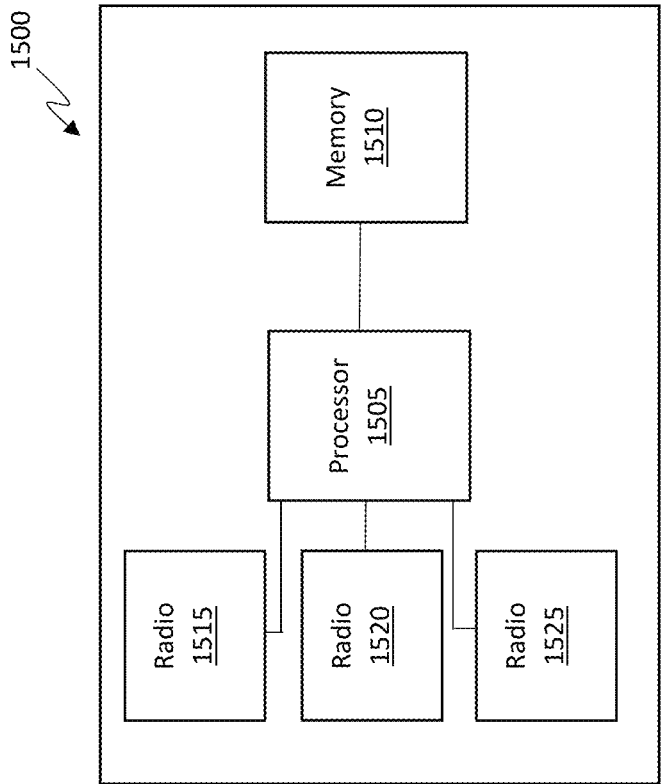
FIG. 15 is a block diagram depicting an exemplary computer system platform upon which embodiments of the present invention may be implemented.

FIG. 15 depicts an exemplary wireless device 1500 upon which embodiments of the present invention can be implemented. Embodiments of the present invention are drawn to wireless devices capable of transmitting and/or receiving transmission parameters of available APs and determining coverage information of the APs for performing association with an AP determined to have suitable coverage, for performing link switching, groupcast transmission, or coordinated transmission in a multi-AP network, for example.

Wireless device 1500 includes a processor 1505 for running firmware, software applications, and optionally an operating system. Memory 1510 can include read-only memory and/or random-access memory, for example, to store executable machine code and data (e.g., tables of index values) for use by the processor 1505 and data received or transmitted by one or more radios.

In the example of FIG. 15, Radios 1515, 1520, and 1525 can communicate with other electronic devices over a wireless network (e.g., WLAN) using multiple spatial streams (e.g., multiple antennas) and typically operates according to IEEE standards (e.g., IEEE 802.11ax, IEEE 802.11ay, IEEE 802.11be, etc.). Radios 1515, 1520, and 1525 can perform multi-link operations and groupcast transmission and reception. For example, radio 1515 can be configured to operate a first BSS in a first wireless band (e.g., 2.4 GHz), radio 1520 can be configured to operate a second BSS in a second wireless band (e.g., 5 GHz), and radio 1525 can be configured to operate a third BSS in a third wireless band (e.g., 6 GHz). Wireless device 1500 can include more than three radios, according to embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of beacon frame reception in multi-link operation of a wireless network, the method comprising:

a first access point (AP) transmitting beacon transmission parameters of a plurality of APs to a non-AP multi-link device (MLD) over the wireless network wherein the beacon transmission parameters comprise parameters indicating link budget information for the first AP and a second AP; and the second AP transmitting a frame to the non-AP MLD, wherein the second AP is selected to transmit the frame to the non-AP MLD based on the downlink budget information for the first AP and the second AP.

2. The method of claim 1, wherein the non-AP MLD is operable to calculate the path loss information and to estimate coverage information for the plurality of APs according to the beacon transmission parameters.

3. The method of claim 1, wherein the beacon transmission parameters are carried in an STA Info field of a multi-link (ML) element carried in a beacon frame transmitted by the first AP.

4. The method of claim 1, wherein the beacon transmission parameters comprise at least one of: a transmit power parameter; a channel bandwidth parameter; and a transmission data rate parameter.

5. The method of claim 1, wherein the beacon transmission parameters comprise a Link Budget Difference Indication bit carried in a Reduced Neighbor Report (RNR), and wherein the RNR is comprised in a beacon frame transmitted by the first AP.

6. The method of claim 1, wherein the first AP and the second AP are affiliated with different AP MLDs.

7. The method of claim 1, wherein the first AP and the second AP are affiliated with a same AP MLD.

8. The method of claim 1, further comprising the second AP performing an association procedure with the non-AP MLD after the first AP transmits the beacon transmission parameters of the plurality of APs to the non-AP MLD.

9. A method of groupcast reception in a wireless network, the method comprising:

a first access point (AP) transmitting groupcast transmission parameters of a plurality of APs to a non-AP MLD over the wireless network, wherein the groupcast transmission parameters comprise downlink budget information of the first AP and a second AP, and wherein the non-AP MLD is operable to:

calculate path loss information for groupcast frames transmitted from the plurality of APs according to received groupcast transmission information; and calculate reception reliability information for the plurality of APs according to the pathloss information; and the second AP transmitting a groupcast frame to the non-AP MLD, wherein the second AP is selected to transmit the groupcast frame based on the downlink budget information from the groupcast transmission parameters.

10. The method of claim 9, wherein the first AP and the second AP are affiliated with the same AP MLD, and further comprising:

the AP MLD receiving groupcast frame reception reliability information from the non-AP MLD; and the AP MLD selecting the second AP to transmit groupcast frames to the non-AP MLD according to the frame reception reliability information.

11. The method of claim 9, wherein the groupcast transmission parameters comprise information used to calculate the downlink budget information of the first AP and the second AP.

12. The method of claim 11, wherein the second AP is selected based on a link budget difference calculated according to the downlink budget information of the first AP and the second AP.

13. The method of claim 9, wherein the groupcast transmission parameters comprise at least one of: a transmit power parameter; a channel bandwidth parameter; and a transmission data rate parameter.

14. The method of claim 9, wherein the groupcast transmission parameters are comprised in a Reduced Neighbor Report (RNR) carried in a beacon frame transmitted by the first AP.

15. The method of claim 9, wherein the groupcast transmission parameters are carried in an STA Info field of a multi-link (ML) element carried in a groupcast frame transmitted by the first AP.

16

16. The method of claim 9, wherein the first AP and the second AP are affiliated with different AP MLDs.

17. A method of reception in a wireless network, the method comprising:

a first wireless station (STA) of a non-AP multi-link device (MLD) receiving a first frame from a first wireless access point (AP) of an AP MLD, the first frame comprising downlink budget information of APs affiliated with the AP MLD; and the non-AP MLD receiving a second frame from a second AP of the AP MLD, wherein the second AP of the AP MLD is selected to transmit the second frame when a downlink budget of the second AP of the AP MLD is greater than a downlink budget of the first AP of the AP MLD.

18. The method of claim 17, further comprising the non-AP MLD changing a link status of the non-AP MLD to receive the second frame from the second AP of the AP MLD.

19. The method of claim 17, further comprising the non-AP MLD switching to a different wireless channel and using the different wireless channel to receive the second frame from the second AP of the AP MLD according to reachability information transmitted in the first frame.

20. The method of claim 17, wherein the first frame comprises a beacon frame, and wherein the second frame comprises at least one of: a data frame; a management frame; and a control frame.

21. The method of claim 17, wherein the first frame and the second frame comprise groupcast frames, and further comprising:

determining groupcast frame reception reliability information based on reachability information transmitted in the first frame; and transmitting the groupcast frame reception reliability information to the AP MLD, wherein the second AP of the AP MLD is selected to transmit the second frame based on the groupcast frame reception reliability information.

* * * * *